(12) United States Patent
Thomas et al.

(10) Patent No.: US 10,917,278 B2
(45) Date of Patent: Feb. 9, 2021

(54) FREQUENCY-DOMAIN TRANSMITTERS AND RECEIVERS WHICH ADAPT TO DIFFERENT SUBCARRIER SPACING CONFIGURATIONS

(71) Applicant: NOKIA TECHNOLOGIES OY, Espoo (FI)

(72) Inventors: Timothy A. Thomas, Palatine, IL (US); Dennis Ogbe, Lafayette, TX (US); Kiran Venugopal, Austin, TX (US); Amitabha Ghosh, Buffalo Grove, IL (US)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/608,350

(22) PCT Filed: Apr. 28, 2017

(86) PCT No.: PCT/US2017/030141
§ 371 (c)(1),
(2) Date: Oct. 25, 2019

(87) PCT Pub. No.: WO2018/199984
PCT Pub. Date: Nov. 1, 2018

(65) Prior Publication Data
US 2020/0169440 A1 May 28, 2020

(51) Int. Cl.
*H04L 27/26* (2006.01)
*H04W 72/04* (2009.01)

(52) U.S. Cl.
CPC ........ *H04L 27/265* (2013.01); *H04L 27/2608* (2013.01); *H04W 72/0406* (2013.01)

(58) Field of Classification Search
None
See application file for complete search history.

(56) References Cited

U.S. PATENT DOCUMENTS 9,130,810 B2 * 9/2015 Laroia ................. H04L 27/2626
10,674,463 B2 * 6/2020 Ko ....................... H04W 72/005
(Continued)

FOREIGN PATENT DOCUMENTS

EP 3616375 A1 * 3/2020 .......... H04L 27/265
WO 2015/061729 A1 4/2015
(Continued)

OTHER PUBLICATIONS

International Search Report and Written Opinion dated Jan. 12, 2018 corresponding to International Patent Application No. PCT/US2017/030141.
(Continued)

*Primary Examiner* — Berhanu Tadese
(74) *Attorney, Agent, or Firm* — Squire Patton Boggs (US) LLP

(57) ABSTRACT

5G, New Radio (NR), numerology, receiver issues. The numerology scheme here consists in keeping the bandwidth constant but varying the subcarrier spacing (ie different tone spacing B for data and K*B for control channels), and correspondingly the symbol duration. Control symbols have a wider subcarrier separation but smaller symbol duration (In the case of beamforming reference signals, it would enable to train K beams in one symbol time period). Receiver issues: Embodiment 1 uses different Rx chains for data and control channels with different FFT sizes (size differing by factor K). Embodiment 2 uses a common identical FFT size (the one of the data channel) for both control and data: For the control channel, either repeat each control symbol K times prior to FFT and performs downsampling afterwards and repeat it for each control symbol, or performs joint processing and FFT for all K control symbols jointly by either time domain linear combination or post FFT frequency processing.

19 Claims, 10 Drawing Sheets

(56) References Cited

U.S. PATENT DOCUMENTS

| | | | | |
|---|---|---|---|---|
| 2012/0163223 | A1* | 6/2012 | Lo | H04L 5/0062 370/252 |
| 2015/0110210 | A1* | 4/2015 | Yang | H04B 7/0417 375/267 |
| 2015/0117433 | A1* | 4/2015 | Zhang | H04L 27/2613 370/338 |
| 2016/0127098 | A1* | 5/2016 | Ng | H04L 5/0048 370/329 |
| 2017/0019905 | A1* | 1/2017 | Ko | H04W 72/08 |
| 2017/0041948 | A1* | 2/2017 | Cheng | H04L 5/0044 |
| 2017/0054457 | A1* | 2/2017 | Heiskanen | H04B 1/0475 |
| 2017/0134236 | A1* | 5/2017 | Patel | H04L 5/0055 |
| 2017/0164350 | A1* | 6/2017 | Sun | H04L 5/0007 |
| 2017/0295000 | A1* | 10/2017 | Yoo | H04B 17/336 |
| 2017/0332359 | A1* | 11/2017 | Tsai | H04B 7/0639 |
| 2018/0049173 | A1* | 2/2018 | Chen | H04W 72/044 |
| 2018/0063835 | A1* | 3/2018 | Abedini | H04B 7/0408 |
| 2018/0083680 | A1* | 3/2018 | Guo | H04L 5/0048 |
| 2018/0091267 | A1* | 3/2018 | Kim | H04L 27/2602 |
| 2018/0098312 | A1* | 4/2018 | Lin | H04L 5/0007 |
| 2018/0132264 | A1* | 5/2018 | Jung | H04L 1/1812 |
| 2018/0146439 | A1* | 5/2018 | Kim | H04W 52/283 |
| 2018/0206263 | A1* | 7/2018 | Lin | H04W 56/0016 |
| 2018/0255572 | A1* | 9/2018 | Harada | H04L 27/2613 |
| 2018/0310283 | A1* | 10/2018 | Deenoo | H04W 72/042 |
| 2018/0310300 | A1* | 10/2018 | Lin | H04W 72/0413 |
| 2018/0316532 | A1* | 11/2018 | Tie | H04L 27/2602 |
| 2018/0331816 | A1* | 11/2018 | Harada | H04L 5/22 |
| 2018/0332602 | A1* | 11/2018 | Lee | H04W 72/02 |
| 2018/0367262 | A1* | 12/2018 | Hwang | H04L 1/1854 |
| 2018/0367355 | A1* | 12/2018 | Pan | H04L 27/2607 |
| 2019/0045506 | A1* | 2/2019 | Takeda | H04L 5/0094 |
| 2019/0075581 | A1* | 3/2019 | Salem | H04W 72/1289 |
| 2019/0081832 | A1* | 3/2019 | Marinier | H04L 5/0053 |
| 2019/0081841 | A1* | 3/2019 | Kim | H04W 72/0453 |
| 2019/0141728 | A1* | 5/2019 | Takeda | H04L 27/2692 |
| 2019/0150110 | A1* | 5/2019 | Ko | H04L 5/0053 370/350 |
| 2019/0159238 | A1* | 5/2019 | Kim | H04L 1/1854 |
| 2019/0166627 | A1* | 5/2019 | Takeda | H04L 1/18 |
| 2019/0173656 | A1* | 6/2019 | Takeda | H04W 72/04 |
| 2019/0174449 | A1* | 6/2019 | Shan | H04W 60/00 |
| 2019/0174466 | A1* | 6/2019 | Zhang | H04L 5/005 |
| 2019/0174531 | A1* | 6/2019 | Takeda | H04W 72/1289 |
| 2019/0182821 | A1* | 6/2019 | You | H04W 72/042 |
| 2019/0182884 | A1* | 6/2019 | Deenoo | H04L 1/0061 |
| 2019/0208482 | A1* | 7/2019 | Tooher | H04L 5/0094 |
| 2019/0215777 | A1* | 7/2019 | Kang | H04W 52/08 |
| 2019/0222402 | A1* | 7/2019 | Yang | H04L 5/0082 |
| 2019/0223084 | A1* | 7/2019 | John Wilson | H04L 5/0094 |
| 2019/0223163 | A1* | 7/2019 | Ko | H04L 5/001 |
| 2019/0229878 | A1* | 7/2019 | Takeda | H04W 72/02 |
| 2019/0261331 | A1* | 8/2019 | Guthmann | H04L 5/0094 |
| 2019/0268103 | A1* | 8/2019 | Park | H04L 5/0055 |
| 2019/0281587 | A1* | 9/2019 | Zhang | H04L 5/0044 |
| 2019/0281588 | A1* | 9/2019 | Zhang | H04L 5/0051 |
| 2019/0306852 | A1* | 10/2019 | Nayeb Nazar | H04W 72/0413 |
| 2019/0320467 | A1* | 10/2019 | Freda | H04W 74/0833 |
| 2019/0327037 | A1* | 10/2019 | Yoshimoto | H04L 5/001 |
| 2019/0342060 | A1* | 11/2019 | Parkvall | H04L 5/0064 |
| 2019/0349920 | A1* | 11/2019 | Takeda | H04L 5/0053 |
| 2019/0387550 | A1* | 12/2019 | Pan | H04L 5/0094 |
| 2020/0015197 | A1* | 1/2020 | Harada | H04W 72/0453 |
| 2020/0037184 | A1* | 1/2020 | Harada | H04W 80/08 |
| 2020/0052740 | A1* | 2/2020 | Zhang | H04L 5/0048 |
| 2020/0053713 | A1* | 2/2020 | Bang | H04L 5/0053 |
| 2020/0067675 | A1* | 2/2020 | Takeda | H04L 5/0053 |
| 2020/0068420 | A1* | 2/2020 | Chen | H04W 48/12 |
| 2020/0068497 | A1* | 2/2020 | Gong | H04W 52/146 |
| 2020/0092141 | A1* | 3/2020 | Chen | H04L 25/0224 |
| 2020/0092916 | A1* | 3/2020 | Lee | H04W 74/006 |
| 2020/0107245 | A1* | 4/2020 | Takeda | H04W 48/12 |
| 2020/0119965 | A1* | 4/2020 | Harada | H04L 27/2613 |
| 2020/0128578 | A1* | 4/2020 | Park | H04W 72/1289 |
| 2020/0136679 | A1* | 4/2020 | Shen | H04B 7/0617 |
| 2020/0136783 | A1* | 4/2020 | Takeda | H04L 1/0002 |
| 2020/0145271 | A1* | 5/2020 | Bala | H04L 1/0643 |
| 2020/0146108 | A1* | 5/2020 | Goto | H04W 72/0446 |
| 2020/0154481 | A1* | 5/2020 | Goto | H04W 74/004 |
| 2020/0154496 | A1* | 5/2020 | Yi | H04W 72/10 |
| 2020/0169440 | A1* | 5/2020 | Thomas | H04W 72/0406 |
| 2020/0177254 | A1* | 6/2020 | Lee | H04W 56/0045 |
| 2020/0177359 | A1* | 6/2020 | Harada | H04L 5/18 |

FOREIGN PATENT DOCUMENTS

| | | | | |
|---|---|---|---|---|
| WO | WO-2015061729 A1 * | 4/2015 | | H04L 1/0057 |
| WO | 2016/033386 A1 | 3/2016 | | |
| WO | WO-2016033386 A1 * | 3/2016 | | H04L 27/2613 |
| WO | WO-2017150813 A1 * | 9/2017 | | H04L 5/0053 |
| WO | WO-2018199984 A1 * | 11/2018 | | H04L 27/2613 |

OTHER PUBLICATIONS

CATT: "Discussion of NR Numerology," 3GPP Draft; R1-164249, 3GPP TSG RAN WG1 Meeting #85, Nanjing, China, May 23-27, 2016, May 14, 2016, XP051090037.

* cited by examiner

|  | Base | 1 | 2 |
|---|---|---|---|
| Nominal Bandwidth (MHz) | 100 | 100 | 100 |
| FFT Size | 2048 | 2048 | 2048 |
| Used Carriers | 1600 | 800 | 400 |
| Subcarrier Spacing (kHz) | 60 | 120 | 240 |
| Occupied Bandwidth (MHz) | 96 | 96 | 96 |
| Tsample (sec) | 8.1E-09 | 8.1E-09 | 8.1E-09 |
| CP Length (samples) | 37 | 37 | 37 |
| CP Duration (sec) | 3.0E-07 | 3.0E-07 | 3.0E-07 |
| Info Duration | 1.7E-05 | 8.3E-06 | 4.2E-06 |
| OFDM Symbol Duration | 1.7E-05 | 8.6E-06 | 4.5E-06 |
| CP Overhead | 1.77% | 3.49% | 6.74% |

FIG. 2

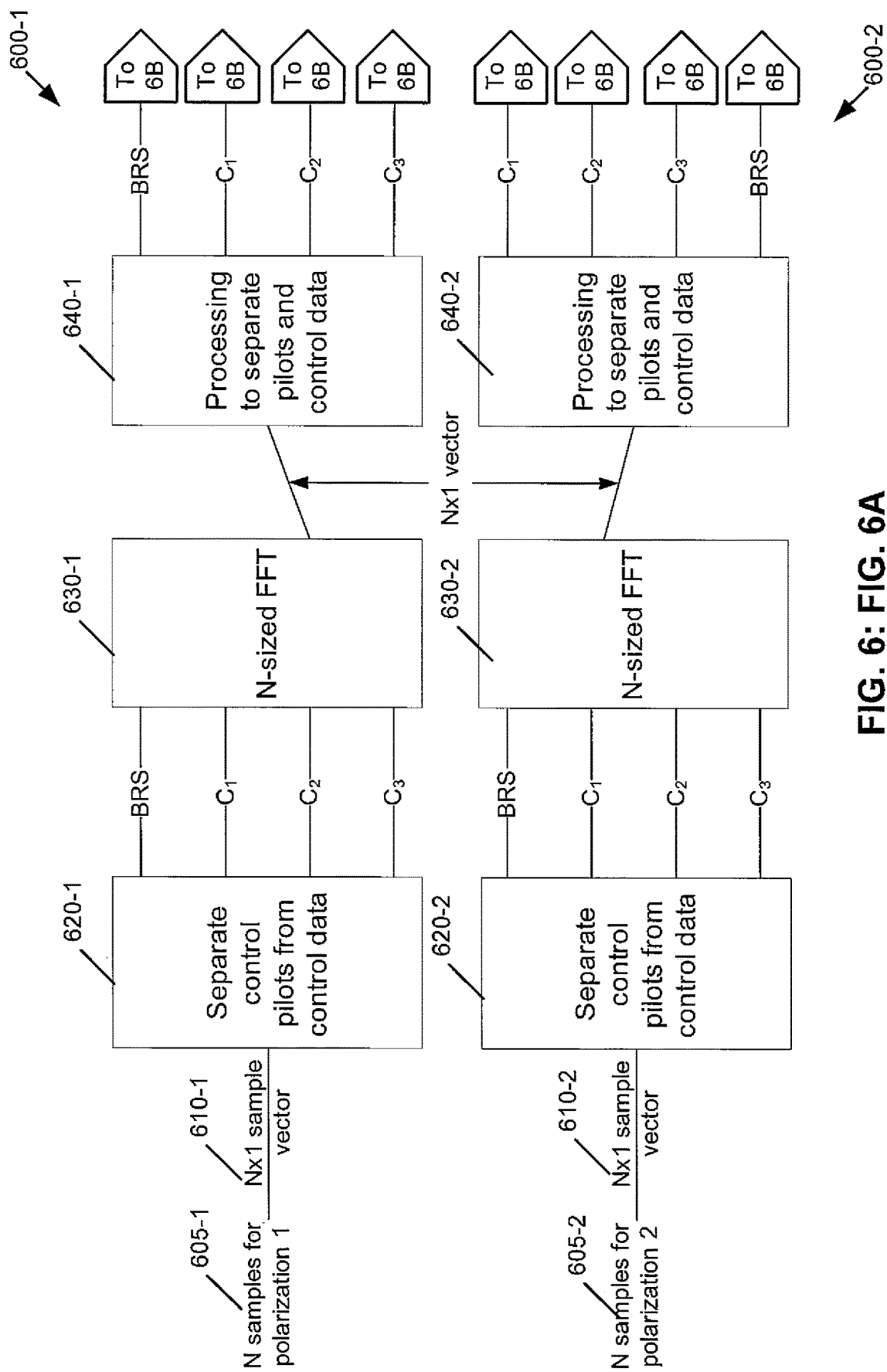
FIG. 6: FIG. 6A

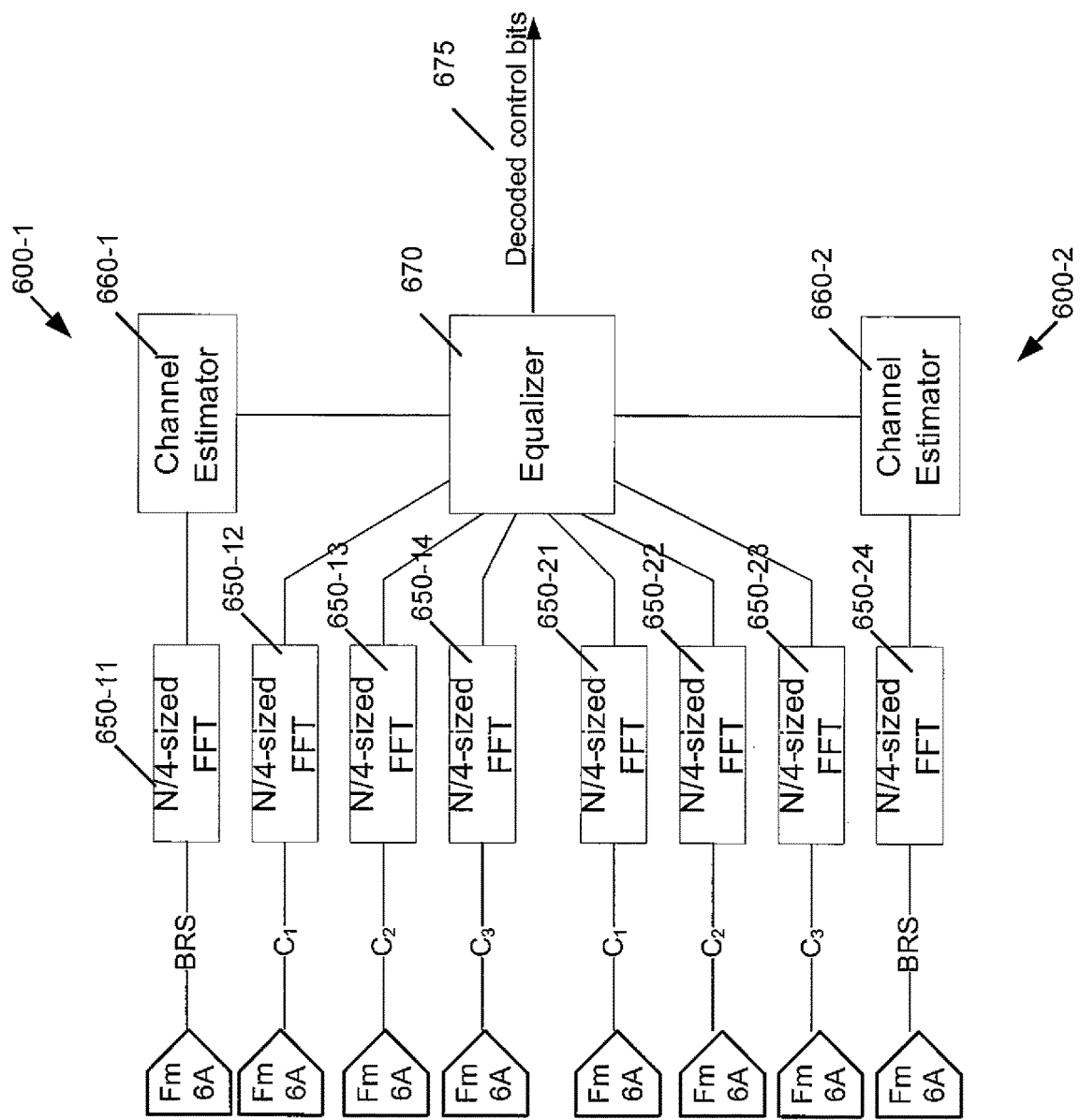
FIG. 6: FIG. 6B

FREQUENCY-DOMAIN TRANSMITTERS AND RECEIVERS WHICH ADAPT TO DIFFERENT SUBCARRIER SPACING CONFIGURATIONS

TECHNICAL FIELD

This invention relates generally to reception in wireless communication system and, more specifically, relates to adaptive receivers.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Abbreviations that may be found in the specification and/or the drawing figures are defined below, after the main part of the detailed description section.

In LTE, there has been a constant progression in "generations". The fourth generation (4G) offered much improved uplink and downlink speeds over previous generations. The base station for 4G is referred to as an eNB. The fifth generation (5G) is being implemented now and offers further advancements, e.g., in improved uplink and downlink speeds over 4G. The base station for 5G is referred to as a gNB. Technologies for 5G are often referred to as "New Radio" (NR), as NR is a study item in the 3GPP radio access network (RAN) working group and will be an enabler for 5G cellular networks.

For 5G receivers in a NR, there will likely be more challenges for NR reception.

BRIEF SUMMARY

This section is intended to include examples and is not intended to be limiting.

In an exemplary embodiment, an apparatus comprises a frequency-domain receiver comprising circuitry which operates with at least two different subcarrier spacings, one for data channels and another one for control channels Subcarrier spacing of a portion of a time-frequency space containing the control channels is B times as large as the subcarrier spacing of a portion of the time-frequency space containing the data channels, wherein B is an integer greater than one. The circuitry is configured to perform operations comprising: receiving N time samples during a data transmission and N time samples during a control transmission; separating the N samples received during the control transmission into a number of time-domain sub-blocks that is greater than or equal to B; processing the N samples in the number of time-domain sub-blocks to create a same number frequency-domain sub-blocks, wherein the frequency-domain sub-blocks have a size of N divided by the number; processing the number of frequency-domain sub-blocks to determine decoded control bits; and outputting the decoded control bits.

Another exemplary embodiment comprises a method comprising: receiving signals using at least two different subcarrier spacings, one for data channels and another one for control channels, where subcarrier spacing of a portion of a time-frequency space containing the control channels is B times as large as the subcarrier spacing of a portion of the time-frequency space containing the data channels, wherein B is an integer greater than one, and wherein receiving comprises receiving N time samples during a data transmission and N time samples during a control transmission; separating the N samples received during the control transmission into a number of time-domain sub-blocks that is greater than or equal to B; processing the N samples in the number of time-domain sub-blocks to create a same number frequency-domain sub-blocks, wherein the frequency-domain sub-blocks have a size of N divided by the number; processing the number of frequency-domain sub-blocks to determine decoded control bits; and outputting the decoded control bits.

An additional example of an embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer.

Another exemplary embodiment comprises an apparatus comprising: means for receiving signals using at least two different subcarrier spacings, one for data channels and another one for control channels, where subcarrier spacing of a portion of a time-frequency space containing the control channels is B times as large as the subcarrier spacing of a portion of the time-frequency space containing the data channels, wherein B is an integer greater than one, and wherein the means for receiving comprises means for receiving N time samples during a data transmission and N time samples during a control transmission; means for separating the N samples received during the control transmission into a number of time-domain sub-blocks that is greater than or equal to B; means for processing the N samples in the number of time-domain sub-blocks to create a same number frequency-domain sub-blocks, wherein the frequency-domain sub-blocks have a size of N divided by the number; means for processing the number of frequency-domain sub-blocks to determine decoded control bits; and means for outputting the decoded control bits.

In an additional exemplary embodiment, an apparatus comprises: a frequency-domain transmitter configured to transmit signals using at least two different subcarrier spacings, one for data channels and another one for control channels, where subcarrier spacing of a portion of a time-frequency space containing the control channels is B times as large as the subcarrier spacing of a portion of the time-frequency space containing the data channels, wherein B is an integer greater than one, and wherein the circuitry is configured to perform operations comprising: transmitting N time samples for data channels during a data transmission, using a first one of the two different subcarrier spacings; and transmitting N time samples for control channels during a control transmission, using a second, different one of the two different subcarrier spacings.

A further exemplary embodiment is a method, comprising: receiving signals using at least two different subcarrier spacings, one for data channels and another one for control channels, where subcarrier spacing of a portion of a time-frequency space containing the control channels is B times as large as the subcarrier spacing of a portion of the time-frequency space containing the data channels, wherein B is an integer greater than one, and wherein receiving comprises receiving N time samples during a data transmission and N time samples during a control transmission;

separating the N samples received during the control transmission into a number of time-domain sub-blocks that is greater than or equal to B; processing the N samples in the number of time-domain sub-blocks to create a same number frequency-domain sub-blocks, wherein the frequency-domain sub-blocks have a size of N divided by the number; processing the number of frequency-domain sub-blocks to determine decoded control bits; and outputting the decoded control bits.

An additional example of an embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer.

A further exemplary embodiment is an apparatus comprising: means for transmitting signals using at least two different subcarrier spacings, one for data channels and another one for control channels, where subcarrier spacing of a portion of a time-frequency space containing the control channels is B times as large as the subcarrier spacing of a portion of the time-frequency space containing the data channels, wherein B is an integer greater than one, and wherein the means for transmitting comprises: means for transmitting N time samples for data channels during a data transmission, using a first one of the two different subcarrier spacings; and means for transmitting N time samples for control channels during a control transmission, using a second, different one of the two different subcarrier spacings.

BRIEF DESCRIPTION OF THE DRAWINGS

In the attached Drawing Figures:

FIG. 2 is a table ("Table 1") that introduces some example numerologies for data and broadcast subcarrier spacing configurations for an OFDM system;

FIG. 6, which is divided into FIGS. 6A and 6B, illustrates an exemplary Rx configuration (referred to as "option b)") for OFDM with two receiver chains;

DETAILED DESCRIPTION OF THE DRAWINGS

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The exemplary embodiments herein describe techniques and apparatus concerning frequency-domain receivers, which adapt to different subcarrier spacing configurations. Transmitters that provide signals with different subcarrier spacing configurations are also described. Additional description of these techniques is presented after a system into which the exemplary embodiments may be used is described.

The receivers described herein are applicable both at a gNB (e.g., for decoding uplink) and at a UE (e.g., for decoding downlink). Primary reference herein is made to a gNB, but the base stations may be an eNB or other base station.

Figure 1:
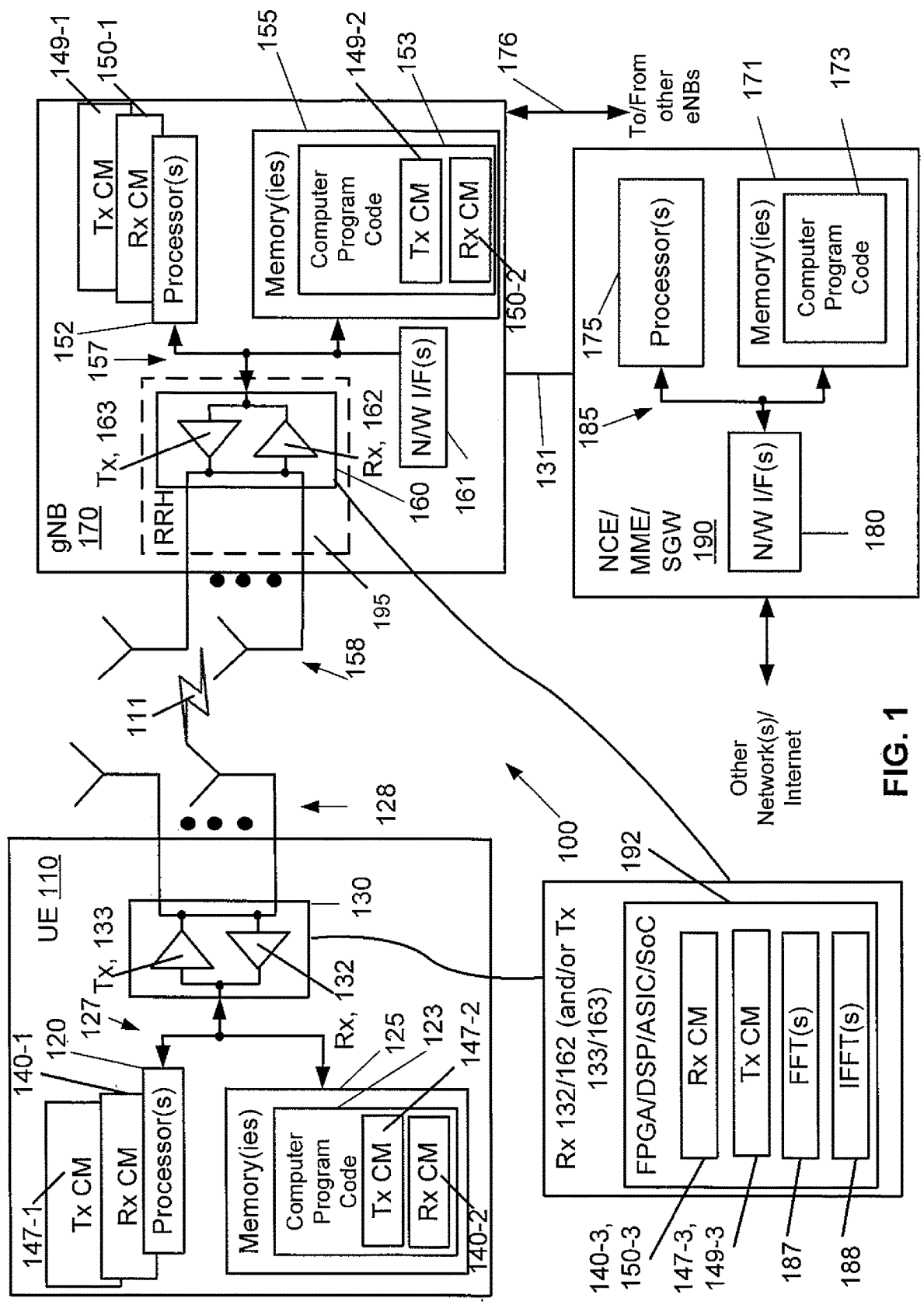
FIG. 1 is a block diagram of one possible and non-limiting exemplary system in which the exemplary embodiments may be practiced.

Turning to FIG. 1, this figure shows a block diagram of one possible and non-limiting exemplary system in which the exemplary embodiments may be practiced. In FIG. 1, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123.

The examples herein involve the receiver 132. The UE 110 further includes an Rx control module (CM) 140, comprising one of or both parts 140-1 and/or 140-2, which may be implemented in a number of ways, and which may implement some or all of the techniques presented herein for receiver 132. The Rx CM 140 may be implemented in hardware as Rx CM 140-1, such as being implemented as part of the one or more processors 120. The Rx CM 140-1 may be implemented also as an integrated circuit or through other hardware such as a programmable gate array. In another example, the Rx control module 140 may be implemented as Rx CM 140-2, which is implemented as computer program code 123 and is executed by the one or more processors 120. The UE 110 communicates with gNB 170 via a wireless link 111.

The gNB 170 is a base station (e.g., for NR) that provides access by wireless devices such as the UE 110 to the wireless network 100. The gNB 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153.

The examples herein involve the receiver 162. The gNB 170 includes an Rx control module (CM) 150, comprising one of or both parts 150-1 and/or 150-2. The Rx CM 150 may perform the examples provided herein for the receiver 162, for part or all of the receiver 162. The Rx CM 150 may be implemented in a number of ways. The Rx CM 150 may be implemented in hardware as Rx CM 150-1, such as being implemented as part of the one or more processors 152. The Rx CM 150-1 may be implemented also as an integrated circuit or through other hardware such as a programmable gate array. In another example, the Rx CM 150 may be implemented as Rx CM 150-2, which is implemented as computer program code 153 and is executed by the one or more processors 152. For instance, the one or more memories 155 and the computer program code 153 may be configured to, with the one or more processors 152, cause the gNB 170 to perform one or more of the operations as described herein. The one or more network interfaces 161 communicate over a network such as via the links 176 and 131. Two or more gNBs 170 communicate using, e.g., link 176. The link 176 may be wired or wireless or both and may implement, e.g., an X2 interface.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the gNB 170 being physically in a different location from the RRH, and the one or more buses 157 could be implemented in part as fiber optic cable to connect the other elements of the gNB 170 to the RRH 195.

One additional possible implementation for receivers 132 or 162 (or both) is also illustrated by FIG. 1. In this example, the receiver 132/162 is implemented in part or completely via one or more of an FPGA, a DSP, or an ASIC (or other integrated circuit, such as system on a chip, SoC), illustrated by reference 192. The Rx control module (CM) 140-3 (for receiver 132 of the UE 110) or 150-3 (for receiver 162 of gNB) can contain the entire functionality described herein, or some part of the functionality and the other part of the functionality may be implemented in one or both of Rx control modules 140-1/140-2 or 150-1/150-2. Additionally, the FFT(s) 187 for the receivers 132/162 or the IFFT(s) 188 for the transmitters 133/163 may be implemented in hardware in the FPGA, a DSP, or an ASIC (or other integrated circuit, such as system on a chip, SoC) 192 or in the Rx CM 140-1/140-2, 150-1/150-2 or in the Tx CM 147-1/147-2, 149-1/149-2.

Furthermore, although the examples herein primarily emphasize reception, the transmitters 133 and/or 163 would also transmit signals with at least two different subcarrier spacings, e.g., where the subcarrier spacing of the broadcast control is greater than that of the subcarrier spacing of the data. There can therefore be a Tx control module (CM) 147-1 as hardware associated with the processor(s) 120, Tx CM 147-2 as software executable by the processor(s) 120, and/or Tx CM 147-3 implemented as an FPGA, DSP, ASIC, and/or SoC 197. Similarly, a Tx control module (CM) 149-1 may be implemented as hardware associated with the processor(s) 152, Tx CM 148-2 as software executable by the processor(s) 152, and/or Tx CM 149-3 implemented as an FPGA, DSP, ASIC, and/or SoC 197.

The wireless network 100 may include a network control element (NCE) 190 that may include MME (Mobility Management Entity)/SGW (Serving Gateway) functionality, and which provides connectivity with a further network, such as a telephone network and/or a data communications network (e.g., the Internet). The gNB 170 is coupled via a link 131 to the NCE 190. The link 131 may be implemented as, e.g., an S1 interface. The NCE 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, gNB 170, and other functions as described herein.

Having thus introduced one suitable but non-limiting technical context for the practice of the exemplary embodiments of this invention, the exemplary embodiments will now be described with greater specificity.

The exemplary embodiments herein involve, for instance, design of a flexible frequency-domain receiver chain, which can support different subcarrier spacing configurations on a per-symbol block (e.g., an OFDM symbol or a block of CP-SC symbol) basis. This kind of flexibility is desirable for 5G systems, since it allows different symbol durations for the reception of broadcast and data channels. One example use would be to define a shorter symbol block duration (and in turn a larger subcarrier spacing) for broadcast channels carrying beamforming reference signals (BRSs). The shorter duration would enable more beams to be trained during the same time period as occupied by regular data symbols. The data symbols would continue to have a longer symbol duration, resulting in tighter subcarrier spacing and increased spectral efficiency.

As an example, if the subcarrier spacing of the broadcast control is four times that of the data, then four broadcast control symbol blocks would fit in the same time space as the single data symbol block (note that for regular CP waveforms like OFDM, an exact fitting of the four smaller symbol blocks into one larger symbol block would require different CP sizes for the broadcast control as the data as will be described later). A receiver might have to be able to adapt to the different subcarrier spacing configurations on a per-symbol basis.

To illustrate this concept, the table (referred to as "Table 1" herein) in FIG. 2 introduces some example numerologies for data and broadcast control subcarrier spacing configurations for an OFDM system. In this example, the numerology for data symbols is in the 'Base' column, while two possible broadcast control channel numerologies are given in the '1' and '2' columns. In both cases, the occupied bandwidth as well as the sampling rate stay constant, while the varying factors are the subcarrier spacing and the symbol duration.

LTE uses different FFT sizes and different sampling rates for different bandwidths. See 3GPP TS 36.211. However, the subcarrier spacing remains constant and hence the broadcast control channels use the same subcarrier spacing as the data channels for the same FFT size (system bandwidth). It is also noted that IEEE 802.11d and 802.11ad are similar to LTE, where the subcarrier spacing is not switched between broadcast control and data.

One exemplary difference between these and the techniques provided herein is that with the techniques herein, the broadcast control channels use a larger subcarrier spacing than the data channels for the same FFT size (e.g., as defined by system bandwidth). To support different subcarrier spacing configurations, a flexible receiver structure is needed and examples of such structures are described herein.

More specifically, flexible frequency-domain receivers are described, which can adapt to different subcarrier spacing configurations for broadcast control and data channels. The techniques may be used with at least the following waveforms: OFDM, discrete Fourier transform (DFT) spread OFDM (DFT-S-OFDM), zero-tail DFT-S-OFDM (ZT-DFT-S-OFDM), CP-SC, NCP-SC, and training-prefix single carrier (TP-SC). It should be noted that primary emphasis is placed herein on receiver chains, but the same techniques can be used for transmitter chains. That is, transmission of data and broadcast control information may use the same techniques as those described for the receive chains, although the transmission would use IFFT(s) 188 while the reception would use FFT(s) 187, as is known.

For the sake of illustration, say we have an OFDM system and that the subcarrier spacing for data symbol blocks is, as in Table 1 of FIG. 2, 60 kHz and the subcarrier spacing for broadcast control OFDM symbols is 120 kHz. Since the occupied bandwidth in both cases remains the same, doubling the subcarrier spacing for the broadcast control symbols means that half the number of time-domain samples have to be processed. In other words, where a 2048-point FFT would have to be computed for the data channel, only a 1024-point FFT is needed for the broadcast control channels due to the shorter symbol duration. This smaller FFT can be implemented in the following two exemplary ways, depending on hardware constraints:

option a) Using different FFT blocks for different subcarrier spacing configurations (small FFT for large spacing, large FFT for tight spacing); or option b) Computing the smaller FFT with the larger FFT block.

Figure 7:
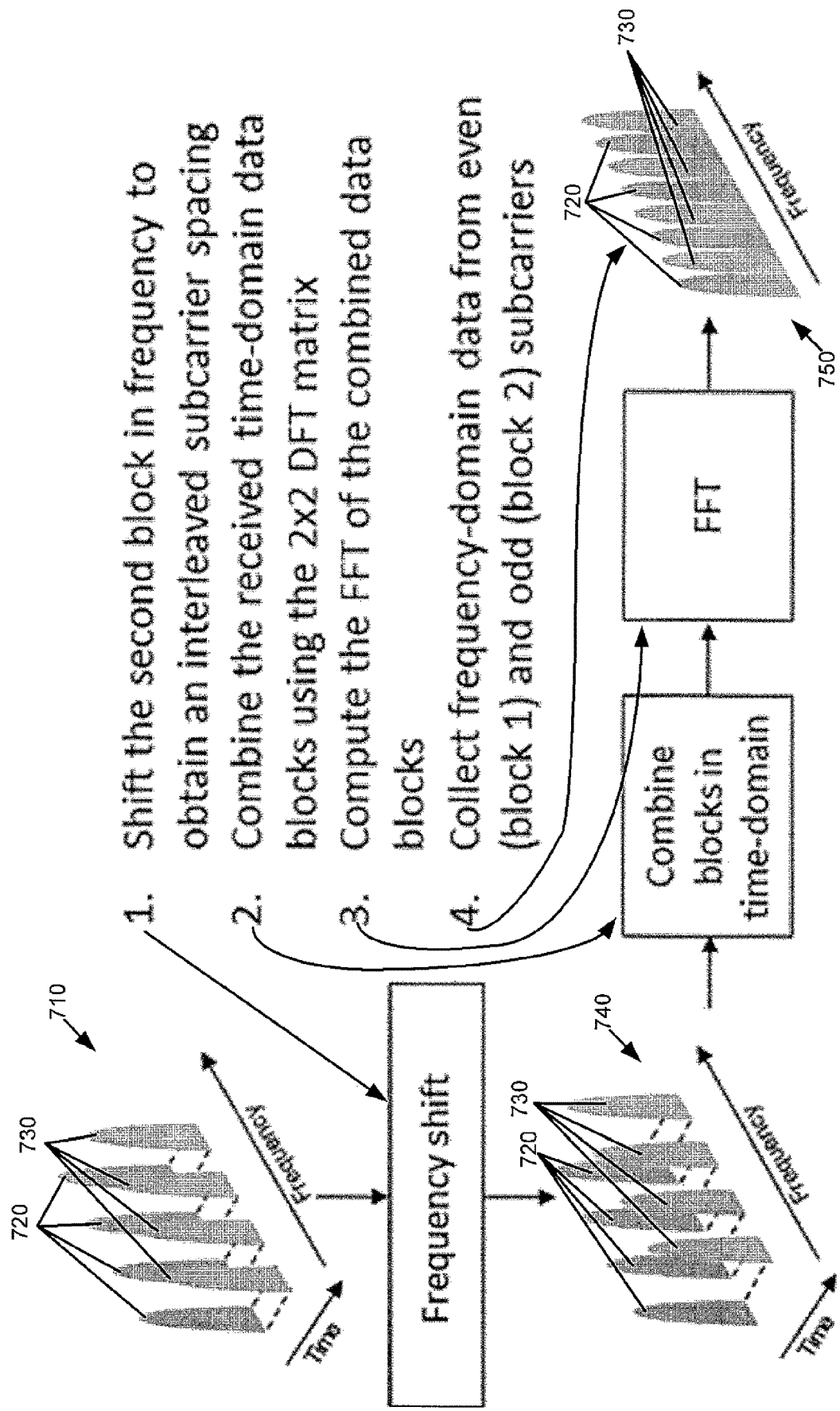
FIG. 7 illustrates how data blocks are shifted in frequency and combined in time before being passed to a 2048-point FFT block, in an exemplary embodiment.

Option a) is exemplified by FIGS. 3 and 4, described below, and option b) is exemplified by FIGS. 5-7, described below. Each of these options is appealing for different reasons. For instance, option b) is appealing since the same FFT can be used on both the data and control/BRS portions, which means a more efficient hardware design, as multiple FFTs do not need to be implemented (and hence hardware resources are saved).

As further examples of these, let N be the FFT size of the tightest subcarrier spacing configuration (e.g., the FFT size used for the data channels). Let the corresponding subcarrier spacing be $\Delta f$. More particularly, a subcarrier spacing of a portion of a time-frequency space containing the control channels may be B times (e.g., two times or some power of two) as large as the subcarrier spacing of a portion of the time-frequency space containing the data channels. To adapt the transmitter chain to support a subcarrier spacing of $2^k \Delta f$, an FFT of size $N/2^k$ must be computed for each of the $2^k$ broadcast control symbols received.

Figure 3:
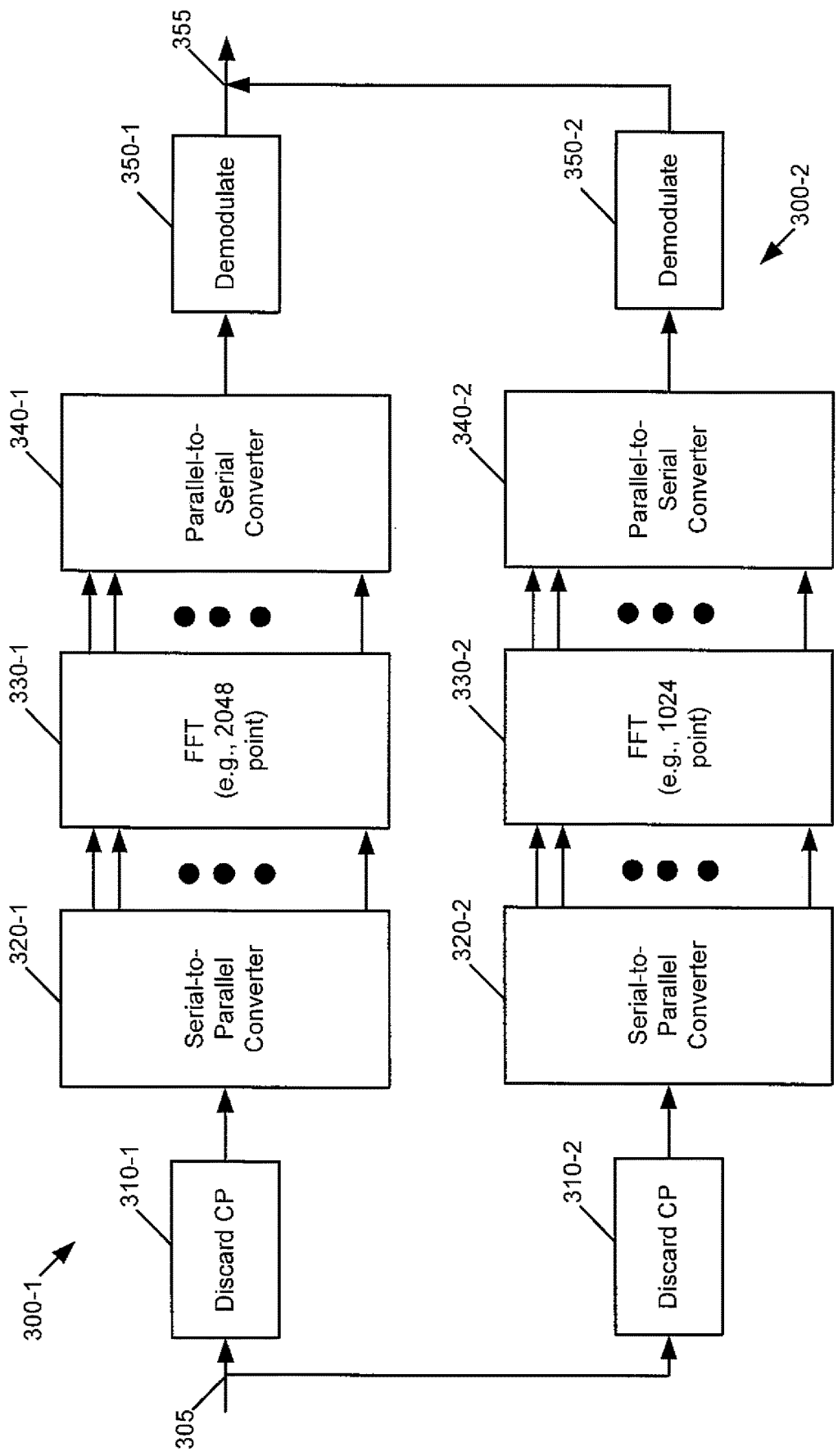
FIG. 3 illustrates traditional OFDM receive chains that are used as part of a frequency-domain receiver which adapts to different subcarrier spacing configurations, in accordance with an exemplary embodiment.

With option a), the receiver would choose between different receive chains 300 similar to the ones illustrated in FIG. 3, each chain 300-1 and 300-2 using a different FFT block. In FIG. 3, the receive chains 300-1, 300-2 (e.g., implemented as part of a receiver 132/162) take input data 305 and produce output data 355. One receive chain 300-1 or 300-2 would be enabled at a time (e.g., by a corresponding Rx control module 140, 150), as per time-division multiplexing. Not also that the broadcast control channels are usually transmitted intermittently. Each receive chain 300-1, 300-2 comprises a discard CP function 310-1 or 310-2, a serial-to-parallel converter 320-1 or 320-2, an FFT 330-1 or 330-2 (as FFT(s) 187), a parallel-to-serial converter 340-1 or 330-2, and a demodulate function 350-1 or 350-2. In the example case mentioned above, a 2048-point FFT block 330-1 would compute the regular data frequency-domain symbols and a distinct 1024-point FFT block 330-2 would compute the broadcast control frequency-domain symbols.

Figure 4:
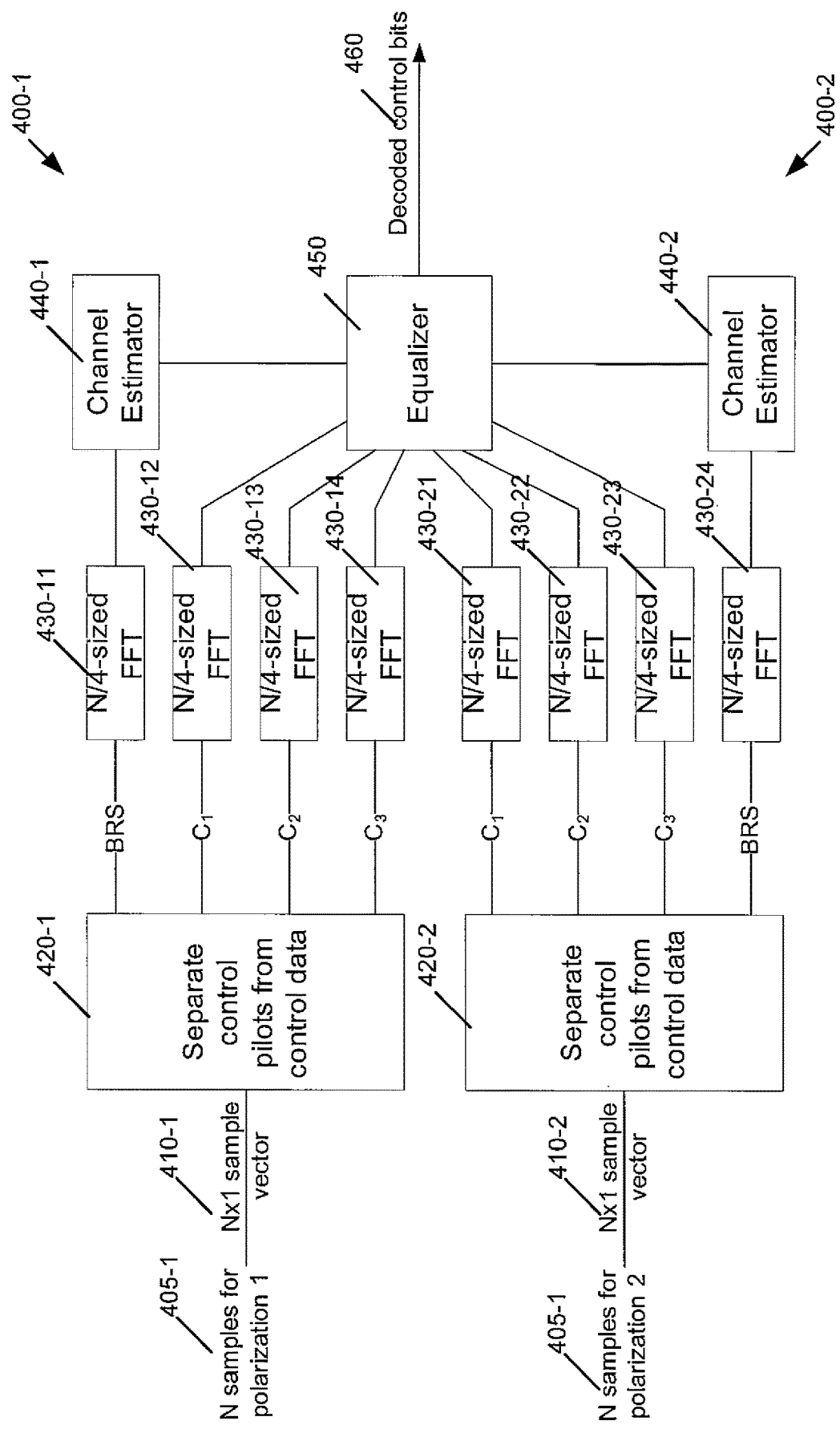
FIG. 4 illustrates an exemplary Rx configuration (referred to as "option a)") for OFDM with two receiver chains.

A further example for option a) is now presented, in reference to FIG. 4, which illustrates an exemplary Rx configuration for OFDM with two receiver chains. Say we have an N-sized FFT on the data, and for the BRS and other control information we want to send and receive four sub-blocks of size N/4. Note that FIG. 4 does not show the N-sized FFT that is used on the data, and instead only shows the part of the receiver dedicated to broadcast control processing. Further say that the first sub-block is the BRS (illustrated in FIG. 4 as BRS) and the second through fourth sub-blocks are control information (control blocks 1, 2 and 3, illustrated as $C_1$, $C_2$, and $C_3$, respectively, in FIG. 4). These control sub-blocks C could contain broadcast control information and the BRS and control C blocks are repeated on multiple beams at the Tx (e.g., Tx 133 or 163 at the UE 110 or base station 170). Then the receiver structure for an OFDM system using option a) is given in FIG. 4 where it is assumed there are two Rx chains 400-1, 400-2 with orthogonal polarizations (e.g., in a mmWave system each of these chains could be the baseband units behind radio-frequency arrays). Here the N samples 405-1, 405-2 for each polarization 1, 2 (creating N×1 sample vectors 410-1, 410-2) are first broken up into the four sub-blocks BRS, $C_1$, $C_2$, and $C_3$ in element 420-1, 420-2 (which separates the control pilots from control data elements). Then N/4 FFTs 430 (as FFT(s) 187) of each sub-block are performed. This example has the receiver chain 400-1 performing N/4-sized FFTs 430-11, 430-12, 430-13, and 430-14 for the sub-blocks BRS, $C_1$, $C_2$, and $C_3$, respectively. Similarly, receiver chain 400-2 performs N/4-sized FFTs 430-21, 430-22, 430-23, and 430-24 for the sub-blocks $C_1$, $C_2$, $C_3$, and BRS, respectively. The BRS portion is used as pilots to compute the channel estimate (using channel estimators 440-1, 440-2) which is then fed into an equalizer block 450 to decode the control messages as decoded control bits 460. The equalizer block 450 joins the two Rx chains 400-1, 400-2. The BRS could also be used to determine the best beam that the transmitter should use for the receiver.

As a more specific example for FIG. 4, assume subcarrier spacing of a portion of a time-frequency space containing the control channels is B times (e.g., two times or some power of two) as large as the subcarrier spacing of a portion of the time-frequency space containing the data channels. A typical processing (such as performed in FIG. 3) has the N time samples received during a control transmission by a receive chain separated into B time-domain sub-blocks. In this example, though, instead of the B time-domain sub-blocks, the N time samples are subdivided into D time-domain sub-blocks (the BRS, $C_1$, $C_2$, and $C_3$ in the example of FIG. 4), where D≥B (D>B in this specific example) and D is an integer. If N=2048 and B=2, then there would be 2 time-domain sub-blocks (each with 2048/2=1024 samples), which would normally be processed. In FIG. 4, however, the N time samples are divided by elements 420 into D time-domain sub-blocks (where D=4) blocks of 512 samples (N/4=2048/4=512) for application to the N/4-sized FFTs 430.

Figure 5:
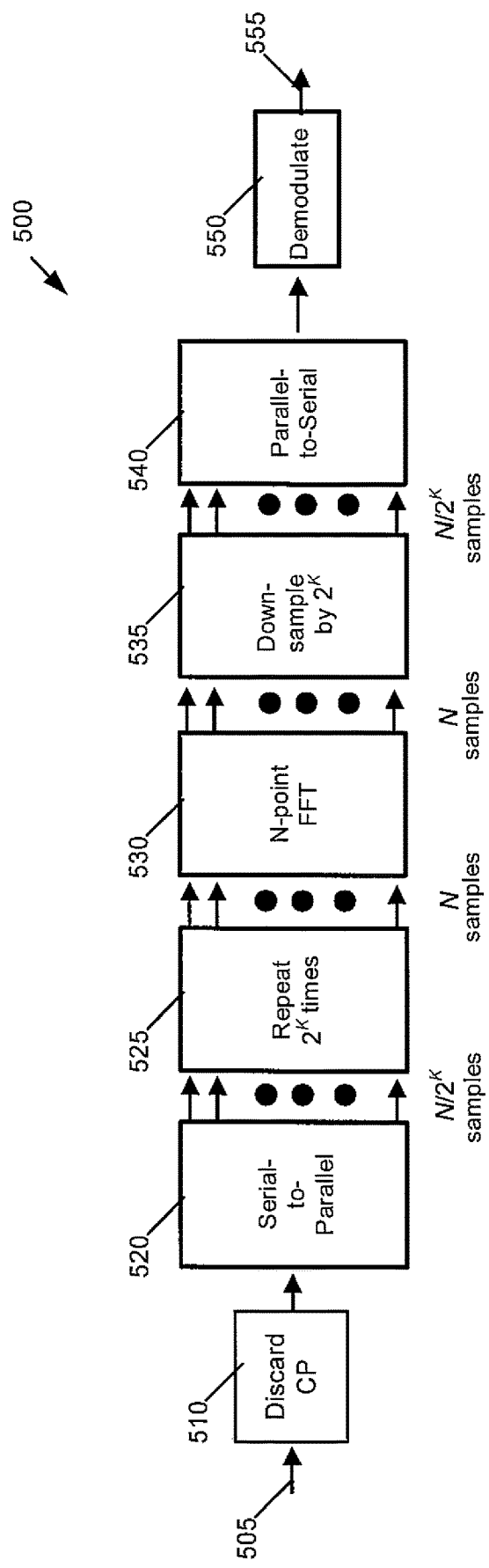
FIG. 5 illustrates an OFDM receive chain that is used as part of a frequency-domain receiver which adapts to different subcarrier spacing configurations, for an Rx configuration (referred to as "option b)")

Regarding option b), examples of which are illustrated in FIGS. 5 and 6 for OFDM, only one FFT block of size N is used. To compute the $N/2^k$-point frequency domain coefficients using the N-point FFT block, the broadcast data stream has to be processed before and/or after the FFT is computed. A simple scheme is given in FIG. 5, in which a receive chain 500 operates on input data 505 to create output data 555, and which comprises a discard CP function 510, a serial-to-parallel converter 520, a repeat $N/2^K$ times function 525, an N-point FFT 530 (as an FFT 187), a down-sample by $2^K$ function 535, a parallel-to-serial converter 540 and a demodulate function 550.

FIG. 6 illustrates a more complex scheme, in which it is illustrated an exemplary Rx configuration (referred to as "option b)") for OFDM with two receiver chains 600-1, 600-2. Each chain 600-1, 600-2 operates on N samples 605-1, 605-2 for polarizations 1, 2, and forms N×1 sample vectors 610-1, 610-2. The vectors 610-1, 610-2 are input into elements 620-1, 620-2, which separate control pilots from control data and get the sub-blocks BRS, $C_1$, $C_2$, and $C_3$, discussed above. Using the terminology described above, these are D time-domain sub-blocks, where D≥B and an integer (and D=4 in this example). Then N-sized FFTs 630-1, 630-2 (as FFT(s) 187) operate on the sub-blocks to produce N×1 vectors, which are processed in a block 640-1, 640-2 in order to separate pilots and control data for a second time. The outputs of blocks 640-1, 640-2 are the sub-blocks BRS, $C_1$, $C_2$, and $C_3$ (e.g., into D frequency-domain sub-blocks) and each of these is operated on by a corresponding N/4-sized FFT 650 (as FFT(s) 187). This example has the receiver chain 600-1 performing N/4-sized FFTs 650-11, 650-12, 650-13, and 650-14 for the sub-blocks BRS, $C_1$, $C_2$, and $C_3$, respectively. Similarly, receiver chain 600-2 performs N/4-sized FFTs 650-21, 650-22, 650-23, and 650-24 for the sub-blocks $C_1$, $C_2$, $C_3$, and BRS, respectively. The BRS portion is used as pilots to compute the channel estimate (using channel estimators 660-1, 660-2) which is then fed into an equalizer block 670 to decode the control messages as decoded control bits 675. The equalizer block 670 joins the two Rx chains 600-1, 600-2.

Returning to FIG. 5, the desired FFT for one OFDM symbol is computed by repeating in block 525 by $2^k$ times the received data stream of length $N/2^k$ samples after removing the CP. The desired frequency domain symbols are then obtained by down-sampling (in block 535) the output of the N-point FFT block to $N/2^k$ samples. Between blocks 525 and 530 and between blocks 530 and 535, N samples are used. Repeating the samples $2^K$ times in block 525 then down-sampling by $2^K$ in block 535 allows a single N-point FFT to be used for control information. The blocks 525 and 535 would not be used for data information.

This approach can be extended to compute all $2^k$ broadcast data blocks using the N-point FFT block at the same time. Instead of repeating the received data stream of length $N/2^k$, the $2^k$ broadcast data blocks can be linearly combined first and then the N-point FFT computed. The desired frequency-domain broadcast data are interleaved in the subcarriers and each can be obtained via down-sampling.

To illustrate, recall the example introduced in Table 1 (see FIG. 2), with a subcarrier spacing of 120 KHz for the broadcast control channel, and with a subcarrier spacing 60 kHz for the data channel. This illustrates that a subcarrier spacing of a portion of a time-frequency space containing the control channels may be B times (e.g., two times in this example) as large as the subcarrier spacing of a portion of the time-frequency space containing the data channels. Doubling the subcarrier spacing means that one can accommodate twice the number of symbols in the same time-slot. As an example, if 14 symbols are used with 60 KHz subcarrier spacing with a time-slot of 100 micro-second, one can accommodate 28 symbols in 100 micro-second with 120 KHz subcarrier spacing. This is because if one doubles the sub-carrier spacing, the OFDM symbol duration is reduced by half. The frequency-domain broadcast control data can be computed, as explained above, as follows:

1) using a 1024-point FFT block, different from the 2048-point FFT block used for the tighter subcarrier spacing data channel, or 2) using the same 2048-point FFT block as the data channel as further explained next.

Repeating once the 1024 time-domain samples of the broadcast channel and then taking a 2048-point FFT, followed by discarding the even subcarriers follows the Rx chain implementation shown in FIG. 5. Alternatively, two successive broadcast channel time domain data blocks of length 1024 each can be used to generate time-domain data of length 2048, which can be passed to the 2048-point FFT block to compute the frequency-domain data symbols for two blocks. This procedure is illustrated in FIG. 7. In this figure, a time-frequency space 710 is illustrated with multiple symbols 720, 730 that are aligned in frequency but separated in time. In this case, the receiver first applies a frequency shift operation (operation 1) to the second data block before combining the time-domain samples of the two blocks. The frequency shift operation (operation 1) effectively shifts the symbols 730 to obtain an interleaved subcarrier spacing, illustrated by time-frequency space 740. In operation 2, the data blocks are combined in the time domain, using, e.g., a 2×2 DFT matrix. Here, for two data blocks, the first half is obtained by summing the two blocks and the second by taking the difference of the two. Then the 2048-point FFT in operation 3, computed using the combined blocks, provides the desired frequency domain symbols with the first data block occupying the odd subcarriers and the second occupying the even subcarriers. This is illustrated by operation 4, where the frequency-domain data is collected from even (block 1) and odd (block 2) subcarriers, and is further illustrated by frequency space 750. As can be seen in frequency space 750, the symbols 720, 730 are interleaved in frequency.

An alternative version of option b) is to perform minimal processing in the time domain but then undo the frequency-domain overlap via processing in the frequency domain as is shown in FIG. 6. This example is illustrated by again returning to the example of four sub-blocks containing BRS, three control portions, and also assuming there are two receiver chains 600-1, 600-2 with orthogonal polarizations 1, 2. On each Rx chain 600-1, 600-2, the four N/4 time-domain sub-blocks are separated (blocks 620-1, 620-2) and then are mapped to time-domain samples to input to the N-point FFT as follows: the BRS are mapped (blocks 620-1, 620-2) to every fourth-time sample starting from time sample 0 (zero), the first control portion is mapped to every fourth-time sample starting from time sample 1, the second control portion is mapped to every fourth-time sample starting from time sample 2, and the third control portion is mapped to every fourth-time sample starting from time sample 3. This type of mapping to time samples can be referred to as a "comb structure". Then an N-point FFT 630-1, 630-2 is taken on each receive chain 600-1, 600-2 of all sub-blocks together, providing N frequency-domain samples for receive branch n, $Z_n(0)$ through $Z_n(N-1)$. These frequency-domain samples contain a combination of all four sub-blocks and hence need to be processed (blocks 640-1, 640-2) to separate out the frequency-domain sub-blocks.

Hence the frequency-domain sub-blocks need to be separated (blocks 640-1, 640-2) which is performed as follows. Say $R_{n,0}(k)$ are the N/4 frequency-domain samples for the BRS on receiver n, and $R_{n,1}(k)$ through $R_{n,3}(k)$ are the N/4 frequency-domain samples for control sub-blocks 1-3 respectively on receiver n. Then $R_{n,m}(k)$, $\{0 \leq m \leq 2\}$, can be found as:

$$R_{n,m}(k) = e^{j2\pi(m-1)k/N} \sum_{l=1}^{4} F_e\{m, l\} Z_n(0.25(l-1)N + k),$$

where $F_e\{m,l\}$ is the $(m,l)^{th}$ element of $F_e$ which is:

$$F_e = \begin{bmatrix} 1 & 1 & 1 & 1 \\ 1 & j & -1 & -j \\ 1 & -1 & 1 & -1 \\ 1 & -j & -1 & j \end{bmatrix}.$$

Note that the phase shift is needed to undo the effect of starting at different time samples at the input to the FFT. In the example of FIG. 6, the block 640 implements the multiplication by the $F_e\{m,l\}$ to produce the $R_{n,m}(k)$.

The implementation described in option a) has a complexity of $$N\log\left(\frac{N}{2^k}\right)$$

due to the FFT block of size $N/2^k$ that may be invoked $2^k$ times to process the time domain broadcast data stream of size $N/2^k$ to fit in the same subframe duration. The data channel continues to be processed using the N-point FFT block and hence entails a complexity of N log(N). The combined complexity for both data and broadcast channels is clearly reduced, with the less complex broadcast channel Rx chain contributing to the reduction, in the proposed techniques. In the current implementation with inflexible subcarrier spacing, both data and broadcast channels' FFT operations have a complexity of N log(N).

An advantage of using the implementation described in option b) is that a single FFT block of size N can be used for both the broadcast and data channels while achieving different subcarrier spacing configurations for the two. This advantage is particularly helpful as additional hardware real estate is not needed for the $N/2^k$ FFT sizes. The additional complexity needed for the broadcast channel with larger subcarrier spacing is incurred by the pre-processing and/or the post-processing blocks, that, however, is of complexity order $(2^k) \ll N$.

Figure 8:
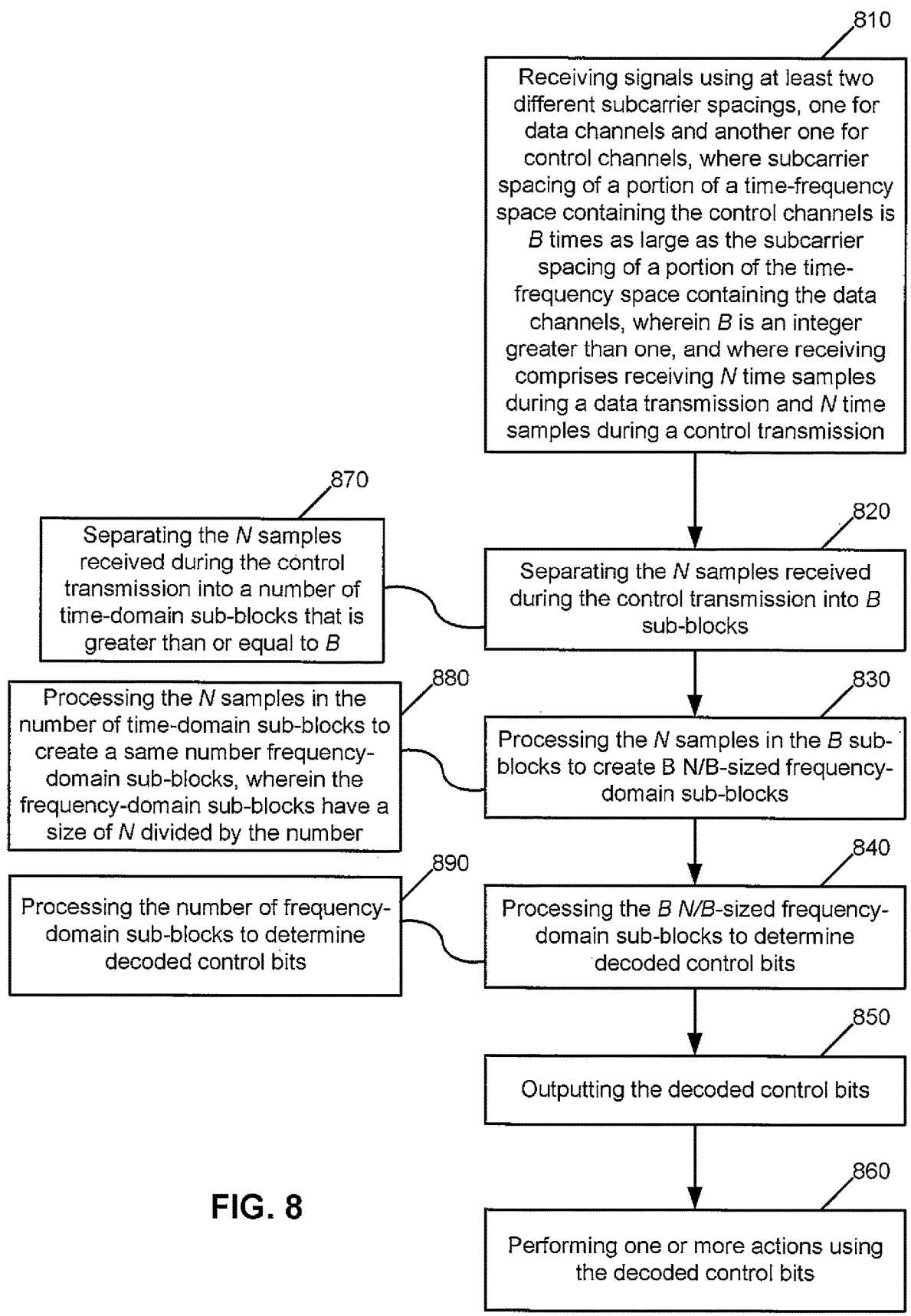
FIG. 8 is a logic flow diagram for performing reception with different subcarrier spacing configurations, and illustrates the operation of an exemplary method, a result of execution of computer program instructions embodied on a computer readable memory, functions performed by logic implemented in hardware, and/or interconnected means for performing functions in accordance with exemplary embodiments.

Turning to FIG. 8, this figure is a logic flow diagram for performing reception with different subcarrier spacing configurations. This figure illustrates the operation of an exemplary method, a result of execution of computer program instructions embodied on a computer readable memory, functions performed by logic implemented in hardware, and/or interconnected means for performing functions in accordance with exemplary embodiments. The operations in FIG. 8 are assumed to be performed by a receiver 132 or 162, e.g., under control at least in part by an Rx control module 140 or 150 in a corresponding one of the UE 110 or gNB 170, respectively.

In block 810, a frequency-domain receiver 132/162 performs the operation of receiving signals using at least two different subcarrier spacings, one for data channels and another one for control channels. The sub carrier spacing of a portion of a time-frequency space containing the control channels is B times as large as the subcarrier spacing of a portion of the time-frequency space containing the data channels. The number B is an integer larger than one. The receiving comprises receiving N time samples during a data transmission and N time samples during a control transmission. In block 820, the receiver 132/162 separates the N samples received during the control transmission into B sub-blocks. The receiver 132/162 in block 830 performs the operation of processing the N samples in the B sub-blocks to create B N/B-sized frequency-domain sub-blocks.

In block 840, the receiver 132/162 performs the operation of processing the B N/B-sized frequency-domain sub-blocks to determine decoded control bits. The receiver 132/162 in block 850 performs outputting the decoded control bits. In block 860 the receiver 132/162 could perform one or more actions using the decoded control bits. This may include actions concerning the beamforming reference signals (BRSs), such as modifying beamforming (e.g., as gNB 170) or reporting feedback based on the BRSs (e.g., as UE 110), or performing operations based on other control signals.

Additional examples are as follows.

Each of the B N/B-sized frequency sub-blocks could be equal in size to a size of an N/B-sized FFT of a respective time-domain sub-block portion.

The B time-domain sub-blocks may be mapped to different time samples of an N-point FFT in a comb structure, where an N-point FFT is used to create the B NIB-sized frequency-domain sub-blocks.

Additionally, some frequency-domain processing may be applied to the frequency-domain samples of an N-point FFT of the N time samples during a control transmission to separate out the frequency domain samples for each of the sub-blocks.

The number of sub-blocks may be a power of 2 (i.e., $2^k$).

Some time-domain processing of the B time-domain sub-blocks may be performed prior to use of an N-point FFT that creates the B N/B-sized frequency-domain sub-blocks.

Blocks 810-860 of FIG. 8 describe one possible set of operations for performing reception with different subcarrier spacing configurations. As noted above, however (see, e.g., FIGS. 4 and 6), the operations are not limited to processing the N samples in the B sub-blocks to create B N/B-sized frequency-domain sub-blocks. As illustrated by FIG. 4, for instance, instead of the B time-domain sub-blocks, the N time samples are subdivided into D time-domain sub-blocks (the BRS, $C_1$, $C_2$, and $C_3$ in the example of FIG. 4), where D≥B (D>B in this specific example) and D is an integer. Thus, block 870 of FIG. 8, the receiver 132/162 performs the operation of separating the N samples received during the control transmission into a number of time-domain sub-blocks that is greater than or equal to B. In block 880, the receiver 132/162 performs the operation of processing the N samples in the number of time-domain sub-blocks to create a same number frequency-domain sub-blocks, wherein the frequency-domain sub-blocks have a size of N divided by the number. The receiver 132/162 performs, in block 890, the operation of processing the number of frequency-domain sub-blocks to determine decoded control bits.

Figure 9:
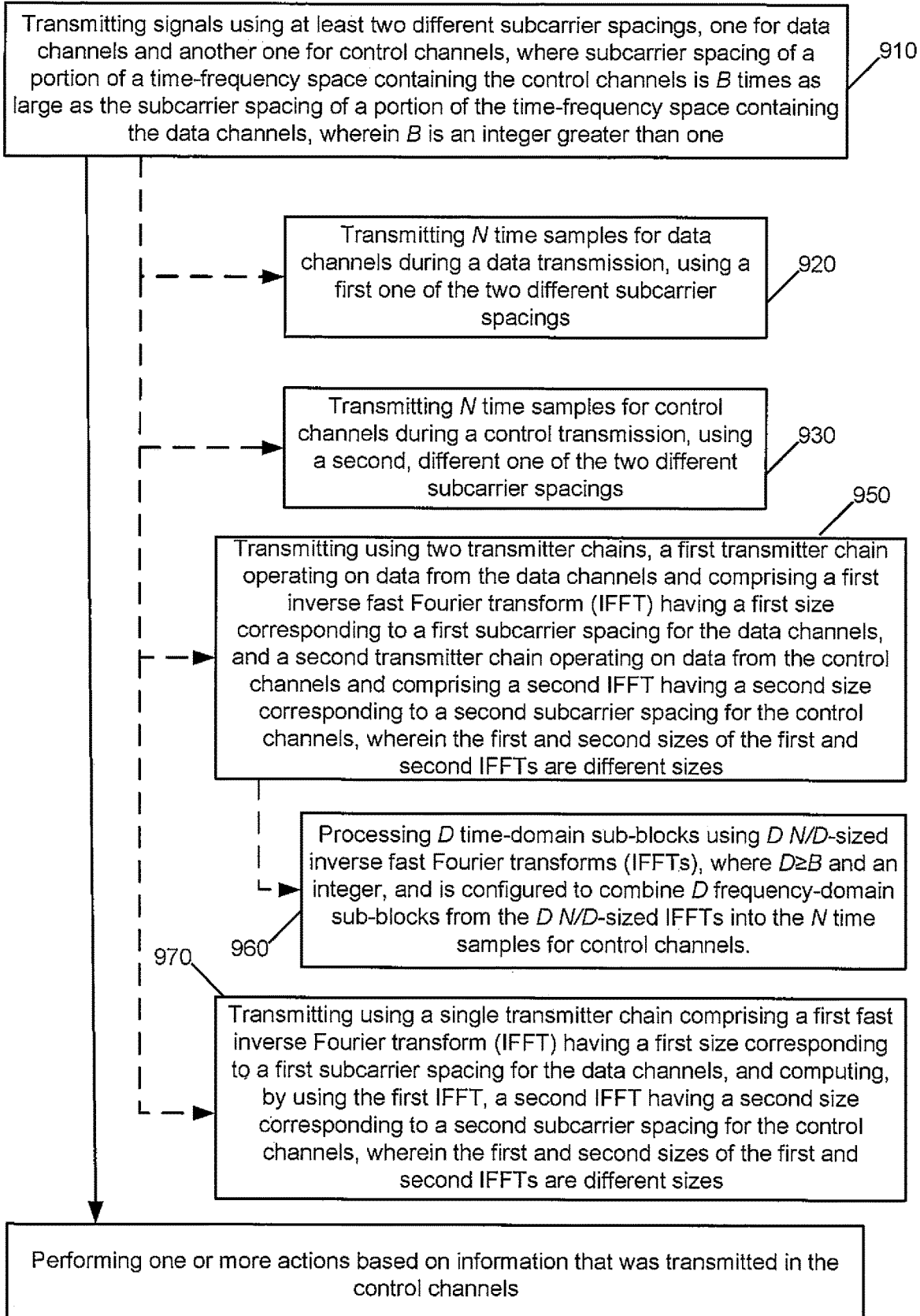
FIG. 9 is a logic flow diagram for performing transmission with different subcarrier spacing configurations, and illustrates the operation of an exemplary method, a result of execution of computer program instructions embodied on a computer readable memory, functions performed by logic implemented in hardware, and/or interconnected means for performing functions in accordance with exemplary embodiments.

The above examples mainly concern reception. FIG. 9, meanwhile, is a logic flow diagram for performing transmission with different subcarrier spacing configurations. FIG. 9 illustrates the operation of an exemplary method, a result of execution of computer program instructions embodied on a computer readable memory, functions performed by logic implemented in hardware, and/or interconnected means for performing functions in accordance with exemplary embodiments. The operations in FIG. 9 are assumed to be performed by a transmitter 133 or 163, e.g., under control at least in part by a Tx control module 147 or 149 in a corresponding one of the UE 110 or gNB 170, respectively.

In block 910, the transmitter 133/163 performs the operation of transmitting signals using at least two different subcarrier spacings, one for data channels and another one for control channels. The subcarrier spacing of a portion of a time-frequency space containing the control channels is B times as large as the subcarrier spacing of a portion of the time-frequency space containing the data channels, wherein B is an integer greater than one. The transmitting in block 910 comprises blocks 920 and 930. The transmitter 133/163 in block 920 performs transmitting N time samples for data channels during a data transmission, using a first one of the two different subcarrier spacings. In block 930, the transmitter 133/163 performs transmitting N time samples for control channels during a control transmission, using a second, different one of the two different subcarrier spacings. The second, different subcarrier spacing for the control channels is B times as large as the subcarrier spacing used for the data channels.

In block 940, the transmitter 133/163 performs the operation of performing one or more actions based on information that was transmitted in the control channels. The actions may include actions concerning the beamforming reference signals (BRSs), such as modifying beamforming or receiving reported feedback based on the BRSs, or performing operations based on other control signals.

FIG. 9 also illustrates other possible examples. In particular, blocks 920 and 930 may be implemented via of one of blocks 950 or 970. In block 950, the transmitter 133/163 performs the operation of transmitting using two transmitter chains, a first transmitter chain operating on data from the data channels and comprising a first inverse fast Fourier transform (IFFT) having a first size corresponding to a first subcarrier spacing for the data channels, and a second transmitter chain operating on data from the control channels and comprising a second IFFT having a second size corresponding to a second subcarrier spacing for the control channels. The first and second sizes of the first and second IFFTs are different sizes. Block 960 illustrates another possibility for block 950, where the transmitter 133/163 performs the operation of processing D time-domain sub-blocks using D N/D-sized inverse fast Fourier transforms (IFFTs), where D≥B and an integer, and is configured to combine D frequency-domain sub-blocks from the D N/D-sized IFFTs into the N time samples for control channels.

In block 970, the transmitter 133/163 performs the operation of transmitting using a single transmitter chain comprising a first fast inverse Fourier transform (IFFT) having a first size corresponding to a first subcarrier spacing for the data channels, and computing, by using the first IFFT, a second IFFT having a second size corresponding to a second subcarrier spacing for the control channels. The first and second sizes of the first and second IFFTs are different sizes.

It is noted that the circuitry (including implementing these by software) for blocks 520, 525, 525, 540, and 550 may be determined by those skilled in the art. The same can be said for blocks 620, 640, 650, 660, and 670; for locks 310, 320, 340, and 350; for blocks 420, 440, 440, and 450; for the blocks/operations for FIG. 7; and for FFT(s) 187 and IFFT(s) 188.

The techniques herein would be useful in 3GPP NR for >40 GHz, since the higher bandwidths will mean the subcarrier spacing will already need to be large and will result in a fairly large FFT size. For example, in the FX-AMPLE project, a 2 GHz bandwidth results in an FFT size of 3072 and a subcarrier spacing of 960 kHz. Going with a smaller subcarrier spacing/FFT size results in an inefficient system, as the CP length becomes large relative to the symbol block length. However, control and BRS can tolerate more inter-block interference and hence can utilize a larger subcarrier spacing, thus enabling more beams to be scanned in the same period of time. So for FX-AMPLE, the control and BRS will use a subcarrier spacing of 3.84 MHz, meaning four control/BRS sub-blocks will fit in the space of a single data symbol block. The techniques disclosed herein are therefore valuable, e.g., if 3GPP accepts a design which includes multiple subcarrier spacings for a given bandwidth.

Without in any way limiting the scope, interpretation, or application of the claims appearing below, a technical effect of one or more of the example embodiments disclosed herein is provide frequency-domain receivers which adapt to different subcarrier spacing configurations.

Additional examples are as follows.

Example 1

An apparatus, comprising:

a frequency-domain receiver comprising circuitry which operates with at least two different subcarrier spacings, one for data channels and another one for control channels, where subcarrier spacing of a portion of a time-frequency space containing the control channels is B times as large as the subcarrier spacing of a portion of the time-frequency space containing the data channels, wherein B is an integer greater than one, and wherein the circuitry is configured to perform operations comprising:

receiving N time samples during a data transmission and N time samples during a control transmission;

separating the N samples received during the control transmission into a number of time-domain sub-blocks that is greater than or equal to B;

processing the N samples in the number of time-domain sub-blocks to create a same number frequency-domain sub-blocks, wherein the frequency-domain sub-blocks have a size of N divided by the number;

processing the number of frequency-domain sub-blocks to determine decoded control bits; and outputting the decoded control bits.

Example 2

The apparatus of example 1, wherein the circuitry comprises two receive chains, a first receive chain operating on data from the data channels and comprising a first fast Fourier transform (FFT) having a first size corresponding to a first subcarrier spacing for the data channels, and a second receive chain operating on data from the control channels and comprising a second FFT having a second size corresponding to a second subcarrier spacing for the control channels, wherein the first and second sizes of the first and second FFTs are different sizes.

Example 3

The apparatus of example 2, wherein the circuitry is configured to separate the N time samples for the control channels into D time-domain sub-blocks, where D≥B and an integer, and comprises D N/D-sized fast Fourier transforms (FFTs), wherein each of the D N/D-sized frequency-domain sub-blocks are equal in size to a respective one of the N/D-sized FFTs of a respective time-domain sub-block portion, and wherein the D N/D-sized FFTs process the N samples in the D time-domain sub-blocks to create the D N/D-sized frequency-domain sub-blocks.

Example 4

The apparatus of example 1, wherein the circuitry comprises a single receive chain comprising a first fast Fourier transform (FFT) having a first size corresponding to a first subcarrier spacing for the data channels, and the circuitry is configured to compute, by using the first FFT, a second FFT having a second size corresponding to a second subcarrier spacing for the control channels, wherein the first and second sizes of the first and second FFTs are different sizes.

Example 5

The apparatus of example 4, wherein the number of time-domain sub-blocks is B, and the circuitry is configured to perform the operation of time-domain processing of the B time-domain sub-blocks prior to use of an N-point fast Fourier transform (FFT) that creates the B N/B-sized frequency-domain sub-blocks, wherein the time-domain processing comprises repeating one of the B N/B-sized time-domain sub-blocks, comprising N/B time samples, by B repetitions prior to using the N-point FFT, and wherein the processing the B N/B-sized frequency-domain sub-blocks to determine decoded control bits comprises downsampling output of the N-point FFT by B times for the one of the B N/B-sized time-domain sub-block to create a B N/B-sized time-domain sub-block.

Example 6

The apparatus of example 4, wherein:

the first FFT is an N-point fast Fourier transform (FFT);

the N time samples received during the control transmission are a set of samples;

separating the N samples received during the control transmission into a number of time-domain sub-blocks that is greater than or equal to B further comprises separating the N time samples received during the control transmission into D time-domain sub-blocks, where D≥B and an integer, and mapping individual ones of samples in the D time-domain sub-blocks to create a comb structure that is applied to the N-point FFT;

processing the N samples in the number of time-domain sub-blocks to create a same number frequency-domain sub-blocks further comprises performing N-point FFT, which outputs N frequency-domain samples, on the comb structure and separating out D frequency-domain sub-blocks from the N frequency-domain samples;

the circuitry comprises D N/D-sized FFTs, each of which operates on one of the D frequency-domain sub-blocks; and the processing the number of N/D-sized frequency-domain sub-blocks to determine decoded control bits is performed in part by the D N/D-sized FFTs.

Example 7

The apparatus of example 4, wherein the first FFT is an N-point fast Fourier transform (FFT) and the number of time-domain sub-blocks is B, and wherein the circuitry is configured to perform an operation of mapping the number of time-domain sub-blocks to different time samples of the N-point FFT in a comb structure, where the N-point FFT is used to create the number of N/B-sized frequency-domain sub-blocks.

Example 8

The apparatus of example 7, wherein mapping comprises performing an operation of shifting a first block of symbols, which are initially aligned in frequency in a time-frequency space with a second block of symbols, to be interleaved with the second block of symbols and combining a resultant number of time-domain sub-blocks to create data applied to the N-point FFT.

Example 9

An apparatus comprising:

a frequency-domain transmitter configured to transmit signals using at least two different subcarrier spacings, one for data channels and another one for control channels, where subcarrier spacing of a portion of a time-frequency space containing the control channels is B times as large as the subcarrier spacing of a portion of the time-frequency space containing the data channels, wherein B is an integer greater than one, and wherein the circuitry is configured to perform operations comprising:

transmitting N time samples for data channels during a data transmission, using a first one of the two different subcarrier spacings; and transmitting N time samples for control channels during a control transmission, using a second, different one of the two different subcarrier spacings.

Example 10

The apparatus of example 9, further comprising performing one or more actions based on information that was transmitted in the control channels.

Example 11

The apparatus of example 9, wherein the circuitry comprises two transmitter chains, a first transmitter chain operating on data from the data channels and comprising a first inverse fast Fourier transform (IFFT) having a first size corresponding to a first subcarrier spacing for the data channels, and a second transmitter chain operating on data from the control channels and comprising a second IFFT having a second size corresponding to a second subcarrier spacing for the control channels, wherein the first and second sizes of the first and second IFFTs are different sizes.

Example 12

The apparatus of example 11, wherein the circuitry is configured to process D time-domain sub-blocks using D N/D-sized inverse fast Fourier transforms (IFFTs), where D≥B and an integer, and is configured to combine D frequency-domain sub-blocks from the D N/D-sized IFFTs into the N time samples for control channels.

Example 13

The apparatus of example 9, wherein the circuitry comprises a single transmitter chain comprising a first fast inverse Fourier transform (IFFT) having a first size corresponding to a first subcarrier spacing for the data channels, and the circuitry is configured to compute, by using the first IFFT, a second IFFT having a second size corresponding to a second subcarrier spacing for the control channels, wherein the first and second sizes of the first and second IFFTs are different sizes.

Example 14

The apparatus of any one of examples 1 to 13, wherein the control channels comprise one or both of control information or BRS information.

Example 15

The apparatus of any one of examples 1 to 14, wherein the number of frequency-domain sub-blocks is a power of two.

Example 16

The apparatus of any one of examples 1 to 15, wherein the signals comprise one or more of the following waveforms: orthogonal frequency division multiplexing (OFDM); discrete Fourier transform (DFT) spread OFDM (DFT-S-OFDM); zero-tail DFT-S-OFDM (ZT-DFT-S-OFDM); cyclic prefix single carrier (CP-SC); null cyclic prefix single carrier (NCP-SC); and training-prefix single carrier (TP-SC).

Example 17

The apparatus of any one of examples 1 to 16, wherein the circuitry comprises at least one processor, and at least one memory including computer program code, and the at least one memory and the computer program code are configured to, with the at least one processor, cause the apparatus to perform the operations.

Example 18

The apparatus of example 17, wherein the at least one memory and the computer program code are configured to, with the at least one processor, cause the apparatus to perform the operations performed by fast Fourier transforms.

Example 19

The apparatus of any one of examples 1 to 18, wherein the circuitry comprises one or more of a field programmable gate array, a digital signal processor, or an integrated circuit.

Example 20

A method, comprising:
receiving signals using at least two different subcarrier spacings, one for data channels and another one for control channels, where subcarrier spacing of a portion of a time-frequency space containing the control channels is B times as large as the subcarrier spacing of a portion of the time-frequency space containing the data channels, wherein B is an integer greater than one, and wherein receiving comprises receiving N time samples during a data transmission and N time samples during a control transmission;
separating the N samples received during the control transmission into a number of time-domain sub-blocks that is greater than or equal to B;
processing the N samples in the number of time-domain sub-blocks to create a same number frequency-domain sub-blocks, wherein the frequency-domain sub-blocks have a size of N divided by the number;
processing the number of frequency-domain sub-blocks to determine decoded control bits; and
outputting the decoded control bits.

Example 21

An apparatus, comprising:
means for receiving signals using at least two different subcarrier spacings, one for data channels and another one for control channels, where subcarrier spacing of a portion of a time-frequency space containing the control channels is B times as large as the subcarrier spacing of a portion of the time-frequency space containing the data channels, wherein B is an integer greater than one, and wherein the means for receiving comprises means for receiving N time samples during a data transmission and N time samples during a control transmission;
means for separating the N samples received during the control transmission into a number of time-domain sub-blocks that is greater than or equal to B;
means for processing the N samples in the number of time-domain sub-blocks to create a same number frequency-domain sub-blocks, wherein the frequency-domain sub-blocks have a size of N divided by the number;
means for processing the number of frequency-domain sub-blocks to determine decoded control bits; and
means for outputting the decoded control bits.

Example 22

The apparatus of example 21, further comprising means for performing any one of examples 2 to 8 or 14 to 19.

Example 23

A method, comprising:
transmitting signals using at least two different subcarrier spacings, one for data channels and another one for control channels, where subcarrier spacing of a portion of a time-frequency space containing the control channels is B times as large as the subcarrier spacing of a portion of the time-frequency space containing the data channels, wherein B is an integer greater than one, and wherein transmitting comprises:
transmitting N time samples for data channels during a data transmission, using a first one of the two different subcarrier spacings; and
transmitting N time samples for control channels during a control transmission, using a second, different one of the two different subcarrier spacings.

Example 24

An apparatus, comprising:
means for transmitting signals using at least two different subcarrier spacings, one for data channels and another one for control channels, where subcarrier spacing of a portion of a time-frequency space containing the control channels is B times as large as the subcarrier spacing of a portion of the time-frequency space containing the data channels, wherein B is an integer greater than one, and wherein the means for transmitting comprises:
means for transmitting N time samples for data channels during a data transmission, using a first one of the two different subcarrier spacings; and
means for transmitting N time samples for control channels during a control transmission, using a second, different one of the two different subcarrier spacings.

Example 25

The apparatus of example 24, further comprising means for performing any one of examples 9 to 13 or 14 to 19.

Example 26

A communication system comprising an apparatus any one of examples 1 to 8, 14 to 19, or 21 or 22 and an apparatus of any one of examples 9 to 13, 14 to 19, or 24 or 25.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, and 171, or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following abbreviations that may be found in the specification and/or the drawing figures are defined as follows:

3GPP third generation partnership project
4G fourth generation
5G fifth generation
ADC analog to digital converter
AP access point
ASIC application specific integrated circuit
BASK binary phase shift keying
BRS beamforming reference signal
BW bandwidth
CM control module
CP cyclic prefix
CP-SC cyclic prefix single carrier
DAC digital to analog converter
DFT discrete Fourier transform
DFT-S-OFDM DFT spread OFDM
DSP digital signal processor
eNB evolved Node B (e.g., an LTE base station)
FFT fast Fourier transform
FPGA field-programmable gate array
gNB a base station for new radio communication
I/F interface
IFFT inverse FFT
LOS line of sight
LTE long term evolution
MME mobility management entity
mmWave millimeter wave
NCE network control element
NCP-SC null cyclic prefix single carrier
NR new radio
N/W network
OFDM orthogonal frequency division multiplexing
OFDMA orthogonal frequency-division multiple access
PA power amplifier
PAPR peak to average power ratio
QAM quadrature amplitude modulation
RF radio frequency
RRH remote radio head
Rx receiver
SC single carrier
SGW serving gateway
SoC system on a chip
TP-SC training prefix single carrier
TS technical standard
Tx transmitter UE user equipment (e.g., a wireless, typically mobile device)

ZT-DFT-S-OFDM zero-tail DFT spread OFDM

What is claimed is:

1. An apparatus, comprising:
a frequency-domain receiver comprising circuitry which operates with at least two different subcarrier spacings, one for data channels and another one for control channels, where subcarrier spacing of a portion of a time-frequency space containing the control channels is B times as large as the subcarrier spacing of a portion of the time-frequency space containing the data channels, wherein B is an integer greater than one, and wherein the circuitry is configured to perform operations comprising:
receiving N time samples during a data transmission and N time samples during a control transmission, wherein N is a value equal to a quantity of time samples;
separating the N samples received during the control transmission into a number of time-domain sub-blocks that is greater than or equal to B;
processing the N samples in the number of time-domain sub-blocks to create a same number frequency-domain sub-blocks, wherein the frequency-domain sub-blocks have a size of N divided by the number;
processing the number of frequency-domain sub-blocks to determine decoded control bits; and
outputting the decoded control bits.

2. The apparatus of claim 1, wherein the circuitry comprises two receive chains, a first receive chain operating on data from the data channels and comprising a first fast Fourier transform (FFT) having a first size corresponding to a first subcarrier spacing for the data channels, and a second receive chain operating on data from the control channels and comprising a second FFT having a second size corresponding to a second subcarrier spacing for the control channels, wherein the first and second sizes of the first and second FFTs are different sizes.

3. The apparatus of claim 2, wherein the circuitry is configured to separate the N time samples for the control channels into D time-domain sub-blocks, where D≥B and an integer, and comprises D N/D-sized fast Fourier transforms (FFTs), wherein each of the D N/D-sized frequency-domain sub-blocks are equal in size to a respective one of the N/D-sized FFTs of a respective time-domain sub-block portion, and wherein the D N/D-sized FFTs process the N samples in the D time-domain sub-blocks to create the D N/D-sized frequency-domain sub-blocks.

4. The apparatus of claim 1, wherein the circuitry comprises a single receive chain comprising a first fast Fourier transform (FFT) having a first size corresponding to a first subcarrier spacing for the data channels, and the circuitry is configured to compute, by using the first FFT, a second FFT having a second size corresponding to a second subcarrier spacing for the control channels, wherein the first and second sizes of the first and second FFTs are different sizes.

5. The apparatus of claim 4, wherein the number of time-domain sub-blocks is B, and the circuitry is configured to perform the operation of time-domain processing of the B time-domain sub-blocks prior to use of an N-point fast Fourier transform (FFT) that creates the B N/B-sized frequency-domain sub-blocks, wherein the time-domain processing comprises repeating one of the B N/B-sized time-domain sub-blocks, comprising N/B time samples, by B repetitions prior to using the N-point FFT, and wherein the processing the B N/B-sized frequency-domain sub-blocks to determine decoded control bits comprises downsampling output of the N-point FFT by B times for the one of the B N/B-sized time-domain sub-block to create a B N/B-sized time-domain sub-block.

6. The apparatus of claim 4, wherein:
the first FFT is an N-point fast Fourier transform (FFT);
the N time samples received during the control transmission are a set of samples;
separating the N samples received during the control transmission into a number of time-domain sub-blocks that is greater than or equal to B further comprises separating the N time samples received during the control transmission into D time-domain sub-blocks, where D≥B and an integer, and mapping individual ones of samples in the D time-domain sub-blocks to create a comb structure that is applied to the N-point FFT;
processing the N samples in the number of time-domain sub-blocks to create a same number frequency-domain sub-blocks further comprises performing N-point FFT, which outputs N frequency-domain samples, on the comb structure and separating out D frequency-domain sub-blocks from the N frequency-domain samples;
the circuitry comprises D N/D-sized FFTs, each of which operates on one of the D frequency-domain sub-blocks; and
the processing the number of N/D-sized frequency-domain sub-blocks to determine decoded control bits is performed in part by the D N/D-sized FFTs.

7. The apparatus of claim 4, wherein the first FFT is an N-point fast Fourier transform (FFT) and the number of time-domain sub-blocks is B, and wherein the circuitry is configured to perform an operation of mapping the number of time-domain sub-blocks to different time samples of the N-point FFT in a comb structure, where the N-point FFT is used to create the number of N/B-sized frequency-domain sub-blocks.

8. The apparatus of claim 7, wherein mapping comprises performing an operation of shifting a first block of symbols, which are initially aligned in frequency in a time-frequency space with a second block of symbols, to be interleaved with the second block of symbols and combining a resultant number of time-domain sub-blocks to create data applied to the N-point FFT.

9. The apparatus of claim 1, wherein the control channels comprise one or both of control information or BRS information.

10. The apparatus of claim 1, wherein the number of frequency-domain sub-blocks is a power of two.

11. The apparatus of claim 1, wherein the signals comprise one or more of the following waveforms: orthogonal frequency division multiplexing (OFDM); discrete Fourier transform (DFT) spread OFDM (DFT-S-OFDM); zero-tail DFT-S-OFDM (ZT-DFT-S-OFDM); cyclic prefix single carrier (CP-SC); null cyclic prefix single carrier (NCP-SC); and training-prefix single carrier (TP-SC).

12. The apparatus of claim 1, wherein the circuitry comprises at least one processor, and at least one memory including computer program code, and the at least one memory and the computer program code are configured to, with the at least one processor, cause the apparatus to perform the operations.

13. The apparatus of claim 12, wherein the at least one memory and the computer program code are configured to, with the at least one processor, cause the apparatus to perform the operations performed by fast Fourier transforms.

14. The apparatus of claim 1, wherein the circuitry comprises one or more of a field programmable gate array, a digital signal processor, or an integrated circuit.

15. An apparatus comprising:
a frequency-domain transmitter comprising circuitry configured to transmit signals using at least two different subcarrier spacings, one for data channels and another one for control channels, where subcarrier spacing of a portion of a time-frequency space containing the control channels is B times as large as the subcarrier spacing of a portion of the time-frequency space containing the data channels, wherein B is an integer greater than one, and wherein the circuitry is configured to perform operations comprising:
transmitting N time samples for data channels during a data transmission, using a first one of the two different subcarrier spacings, wherein N is a value equal to a quantity of time samples; and
transmitting N time samples for control channels during a control transmission, using a second, different one of the two different subcarrier spacings.

16. The apparatus of claim 15, further comprising performing one or more actions based on information that was transmitted in the control channels.

17. The apparatus of claim 15, wherein the circuitry comprises two transmitter chains, a first transmitter chain operating on data from the data channels and comprising a first inverse fast Fourier transform (IFFT) having a first size corresponding to a first subcarrier spacing for the data channels, and a second transmitter chain operating on data from the control channels and comprising a second IFFT having a second size corresponding to a second subcarrier spacing for the control channels, wherein the first and second sizes of the first and second IFFTs are different sizes.

18. The apparatus of claim 17, wherein the circuitry is configured to process D time-domain sub-blocks using D N/D-sized inverse fast Fourier transforms (IFFTs), where D≥B and an integer, and is configured to combine D frequency-domain sub-blocks from the D N/D-sized IFFTs into the N time samples for control channels.

19. The apparatus of claim 15, wherein the circuitry comprises a single transmitter chain comprising a first fast inverse Fourier transform (IFFT) having a first size corresponding to a first subcarrier spacing for the data channels, and the circuitry is configured to compute, by using the first IFFT, a second IFFT having a second size corresponding to a second subcarrier spacing for the control channels, wherein the first and second sizes of the first and second IFFTs are different sizes.

* * * * *